(12) United States Patent
Pannell et al.

(10) Patent No.: US 8,249,064 B1
(45) Date of Patent: Aug. 21, 2012

(54) REMOTE SWITCHING

(75) Inventors: Donald Pannell, Cupertino, CA (US);
Partho Mishra, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 1394 days.

(21) Appl. No.: 11/389,293

(22) Filed: Mar. 24, 2006

Related U.S. Application Data

(60) Provisional application No. 60/695,329, filed on Jun. 29, 2005, provisional application No. 60/695,290, filed on Jun. 30, 2005, provisional application No. 60/696,452, filed on Jul. 1, 2005, provisional application No. 60/697,698, filed on Jul. 8, 2005.

(51) Int. Cl.
*H04L 12/56* (2006.01)
(52) U.S. Cl. .................. 370/389; 370/349; 370/392
(58) Field of Classification Search .............. 370/351, 370/389, 390
See application file for complete search history.

(56) References Cited

U.S. PATENT DOCUMENTS

| | | | | |
|---|---|---|---|---|
| 5,742,604 A | * | 4/1998 | Edsall et al. | 370/401 |
| 5,912,891 A | * | 6/1999 | Kanai | 370/395.51 |
| 6,636,499 B1 | * | 10/2003 | Dowling | 370/338 |
| 6,654,796 B1 | * | 11/2003 | Slater et al. | 709/220 |
| 6,744,783 B1 | * | 6/2004 | Tzeng | 370/469 |
| 6,980,547 B1 | * | 12/2005 | Gally et al. | 370/389 |
| 7,170,885 B2 | * | 1/2007 | Hirota et al. | 370/351 |
| 7,251,217 B2 | * | 7/2007 | Wong et al. | 370/232 |
| 7,420,527 B2 | * | 9/2008 | Sato et al. | 345/2.1 |
| 7,475,177 B2 | * | 1/2009 | Benner et al. | 710/110 |
| 7,539,134 B1 | * | 5/2009 | Bowes | 370/230 |
| 2005/0099983 A1 | * | 5/2005 | Nakamura et al. | 370/338 |
| 2005/0122966 A1 | * | 6/2005 | Bowes | 370/360 |

FOREIGN PATENT DOCUMENTS

WO    WO96/15608    *    5/1996

* cited by examiner

*Primary Examiner* — Dang Ton
*Assistant Examiner* — Pamit Kaur

(57) ABSTRACT

An apparatus having corresponding methods and computer programs comprises first ports to receive first frames, and to transmit second frames, wherein each first port comprises a port ingress circuit to insert into each first frame, source information identifying the first port; a second port to transmit the first frames, and to receive the second frames, wherein each second frame, when received by the second port, comprises destination information identifying one or more of the first ports; and a controller to transfer the first frames from the first ports to the second port, and to transfer the second frames from the second port to one or more of the first ports according to the destination information in the second frame; wherein each first port further comprises a port egress circuit to remove the destination information from each of the second frames before the first port transmits the second frame.

44 Claims, 8 Drawing Sheets

REMOTE SWITCHING

CROSS-REFERENCE TO RELATED APPLICATIONS

This application claims the benefit of U.S. Provisional Patent Applications Ser. No. 60/695,329 filed Jun. 29, 2005; 60/695,290 filed Jun. 30, 2005; 60/696,452 filed Jul. 1, 2005; and 60/697,698 filed Jul. 8, 2005, the disclosures thereof incorporated by reference herein in their entirety.

BACKGROUND

The present invention relates generally to data communications. More particularly, the present invention relates to remote switching.

SUMMARY

In general, in one aspect, the invention features an apparatus comprising: a plurality of first ports to receive first frames of data into the apparatus, and to transmit second frames of the data from the apparatus, wherein each of the first ports comprises a respective port ingress circuit to insert, into each of the first frames of the data received by the respective one of the first ports, source information identifying the respective one of the first ports; a second port to transmit the first frames of the data from the apparatus, and to receive the second frames of the data into the apparatus, wherein each of the second frames of the data, when received by the second port, comprises destination information identifying one or more of the first ports; and a controller to transfer each of the first frames of the data from the first ports to the second port, and to transfer each of the second frames of the data from the second port to one or more of the first ports according to the destination information in the second frame of the data; wherein each of the first ports further comprises a respective port egress circuit to remove the destination information from each of the second frames of the data before the respective one of the first ports transmits the second frame of the data from the apparatus.

In some embodiments, the controller transfers each of the second frames of the data from the second port to the respective one or more of the first ports identified by the destination information in the second frame of the data. In some embodiments, one or more of the second frames of the data comprises source information representing one of the first ports; wherein the controller transfers each of the one or more of the second frames of the data to one or more of the first ports according to the destination information, and the source information, in each of the one or more of the second frames of the data; and wherein the port egress circuits in the one or more of the first ports remove the source information from each of the second frames of the data before the one or more of the first ports transmits the second frame of the data from the apparatus. In some embodiments, when one of the second frames of the data comprises source information that identifies one of the first ports, the controller transfers the one of the second frames of the data to all of the first ports except the one of the first ports. In some embodiments, the first and second frames comprise Ethernet frames. Some embodiments comprise an integrated circuit comprising the apparatus. Some embodiments comprise a wireless access point comprising the apparatus. Some embodiments comprise a game console comprising the apparatus.

In general, in one aspect, the invention features a method for an apparatus comprising a plurality of first ports and a second port, the method comprising: receiving first frames of the data into the apparatus at the first ports; transmitting second frames of the data from the apparatus at the first ports; inserting, into each of the first frames of the data received into the apparatus at a respective one of the first ports, source information identifying the respective one of the first ports; transmitting the first frames of the data from the apparatus at the second port; receiving the second frames of the data into the apparatus at the second port, wherein each of the second frames of the data, when received at the second port, comprises destination information identifying one or more of the first ports; transferring each of the first frames of the data from the first ports to the second port; transferring each of the second frames of the data from the second port to one or more of the first ports according to the destination information in the second frame of the data; and removing the destination information from each of the second frames of the data before the respective one of the first ports transmits the second frame of the data from the apparatus.

In some embodiments, each of the second frames of the data are transferred from the second port to the respective one or more of the first ports identified by the destination information in the second frame of the data. In some embodiments, one or more of the second frames of the data comprises source information representing one of the first ports; wherein each of the one or more of the second frames of the data are transferred to one or more of the first ports according to the destination information, and the source information, in each of the one or more of the second frames of the data; and wherein the source information is removed from each of the second frames of the data before transmitting the second frames of the data from the apparatus at the first ports. In some embodiments, when one of the second frames of the data comprises source information that identifies one of the first ports, the one of the second frames of the data are transferred to all of the first ports except the one of the first ports. In some embodiments, the first and second frames comprise Ethernet frames. Some embodiments comprise an integrated circuit to perform the method.

In general, in one aspect, the invention features an apparatus comprising: a plurality of ports to receive frames of data into the apparatus, and to transmit the frames of the data from the apparatus, the plurality of ports comprising one or more first ports and one or more second ports; a memory to store associations between the ports and network addresses; a controller to transfer the frames among the ports according to the associations between the ports and the network addresses stored in the memory; wherein when a first one of the frames is received into the apparatus by one of the first ports and has a destination network address that is not associated with any of the ports, the controller transfers the first one of the frames to all of the ports except the one of the first ports; and wherein when a second one of the frames is received into the apparatus by one of the second ports and has a destination network address that is not associated with any of the ports, the controller transfers the second one of the frames to all of the ports including the one of the second ports.

In some embodiments, the memory stores associations between the network addresses and trunks of a remote device; and wherein, before transmitting the frames of data from the apparatus, each of the second ports inserts, into each of the frames of the data, a destination trunk indicator indicating one or all of the trunks of the remote device. In some embodiments, each of the frames of the data received into the apparatus by one of the second ports comprises a source trunk identifier identifying one of the trunks of the remote device; and wherein each of the first ports, on receiving one of the frames of the data received into the apparatus by one of the second ports, removes the source trunk identifier before transmitting the one of the frames of the data from the apparatus. In some embodiments, the first and second frames comprise Ethernet frames. Some embodiments comprise an integrated circuit comprising the apparatus. Some embodiments comprise an Ethernet switch comprising the apparatus. Some embodiments comprise a game console comprising the apparatus.

In general, in one aspect, the invention features a method for an apparatus comprising a plurality of ports comprising one or more first ports and one or more second ports, the method comprising: receiving frames of data into the apparatus; transmitting the frames of the data from the apparatus; storing associations between the ports and network addresses; transferring the frames among the ports according to the associations between the ports and the network addresses; transferring a first one of the frames to all of the ports except one of the first ports when the first one of the frames is received into the apparatus by the one of the first ports and has a destination network address that is not associated with any of the ports; and transferring a second one of the frames to all of the ports including one of the second ports when the second one of the frames is received into the apparatus by the one of the second ports and has a destination network address that is not associated with any of the ports.

Some embodiments comprise storing associations between the network addresses and trunks of the remote device; and wherein, before transmitting each of the frames of data from the apparatus at one of the second ports, inserting, into the frame, a destination trunk indicator indicating one or all of the trunks of the remote device. In some embodiments, each of the frames of the data received into the apparatus by one of the second ports comprises a source trunk identifier identifying one of the trunks of the remote device, further comprising: removing the source trunk identifier from each of the frames of the data received into the apparatus by one of the second ports before transmitting the frames of the data from the apparatus from one of the first ports. In some embodiments, the first and second frames comprise Ethernet frames; and wherein the network addresses comprise media access control (MAC) addresses. Some embodiments comprise an integrated circuit to perform the method.

In general, in one aspect, the invention features a frame comprising: a preamble; a start frame delimiter; a destination media access control (MAC) address; a source MAC address; a source trunk tag comprising a source device indicator representing a device that originated the frame, and a source trunk number representing a port of the device that received the frame into the device; a length/type; MAC client data; and a frame check sequence.

In general, in one aspect, the invention features a frame comprising: a preamble; a start frame delimiter; a destination trunk tag comprising a DA_Trunk bit that is set when a destination trunk number of a device is known for the frame, and is clear otherwise, and a DA_Trunk_ID representing the destination trunk number; a destination media access control (MAC) address; a source MAC address; a length/type; MAC client data; and a frame check sequence.

Some embodiments comprise a source trunk tag comprising a source device indicator representing a device that originated the frame, and a source trunk number representing a port of the device that received the frame into the device.

In general, in one aspect, the invention features an apparatus comprising: a plurality of first port means for receiving first frames of data into the apparatus, and for transmitting second frames of the data from the apparatus, wherein each of the first port means comprises respective port ingress means for inserting, into each of the first frames of the data received by the respective one of the first port means, source information identifying the respective one of the first port means; second port means for transmitting the first frames of the data from the apparatus, and for receiving the second frames of the data into the apparatus, wherein each of the second frames of the data, when received by the second port means, comprises destination information identifying one or more of the first port means; and controller means for transferring each of the first frames of the data from the first port means to the second port means, and for transfer each of the second frames of the data from the second port means to one or more of the first port means according to the destination information in the second frame of the data; wherein each of the first port means further comprises respective port egress means for removing the destination information from each of the second frames of the data before the respective one of the first port means transmits the second frame of the data from the apparatus.

In some embodiments, the controller means transfers each of the second frames of the data from the second port means to the respective one or more of the first port means identified by the destination information in the second frame of the data. In some embodiments, one or more of the second frames of the data comprises source information representing one of the first port means; wherein the controller means transfers each of the one or more of the second frames of the data to one or more of the first port means according to the destination information, and the source information, in each of the one or more of the second frames of the data; and wherein the port egress means in the one or more of the first port means remove the source information from each of the second frames of the data before the one or more of the first port means transmits the second frame of the data from the apparatus. In some embodiments, when one of the second frames of the data comprises source information that identifies one of the first port means, the controller means transfers the one of the second frames of the data to all of the first port means except the one of the first port means. In some embodiments, the first and second frames comprise Ethernet frames. Some embodiments comprise an integrated circuit comprising the apparatus. Some embodiments comprise a wireless access point comprising the apparatus. Some embodiments comprise a game console comprising the apparatus.

In general, in one aspect, the invention features a computer program for an apparatus comprising a plurality of first ports and a second port, the computer program comprising: wherein the apparatus receives first frames of the data into the apparatus at the first ports; causing the apparatus to transmit second frames of the data from the apparatus at the first ports; inserting, into each of the first frames of the data received into the apparatus at a respective one of the first ports, source information identifying the respective one of the first ports; causing the apparatus to transmitting the first frames of the data from the apparatus at the second port; wherein the apparatus receives the second frames of the data into the apparatus at the second port, wherein each of the second frames of the data, when received at the second port, comprises destination information identifying one or more of the first ports; causing the apparatus to transfer each of the first frames of the data from the first ports to the second port; causing the apparatus to transfer each of the second frames of the data from the second port to one or more of the first ports according to the destination information in the second frame of the data; and removing the destination information from each of the second frames of the data before the respective one of the first ports transmits the second frame of the data from the apparatus.

In some embodiments, each of the second frames of the data are transferred from the second port to the respective one or more of the first ports identified by the destination information in the second frame of the data. In some embodiments, one or more of the second frames of the data comprises source information representing one of the first ports; wherein each of the one or more of the second frames of the data are transferred to one or more of the first ports according to the destination information, and the source information, in each of the one or more of the second frames of the data; and wherein the source information is removed from each of the second frames of the data before transmitting the second frames of the data from the apparatus at the first ports. In some embodiments, when one of the second frames of the data comprises source information that identifies one of the first ports, the one of the second frames of the data are transferred to all of the first ports except the one of the first ports. In some embodiments, the first and second frames comprise Ethernet frames. Some embodiments comprise an integrated circuit to perform the computer program.

In general, in one aspect, the invention features an apparatus comprising: a plurality of port means for receiving frames of data into the apparatus, and for transmitting the frames of the data from the apparatus, the plurality of port means comprising one or more first port means and one or more second port means; memory means for storing associations between the port means and network addresses; controller means for transferring the frames among the port means according to the associations between the port means and the network addresses stored in the memory means; wherein when a first one of the frames is received into the apparatus by one of the first port means and has a destination network address that is not associated with any of the port means, the controller means transfers the first one of the frames to all of the port means except the one of the first port means; and wherein when a second one of the frames is received into the apparatus by one of the second port means and has a destination network address that is not associated with any of the port means, the controller transfers the second one of the frames to all of the port means including the one of the second port means.

In some embodiments, the memory means stores associations between the network addresses and trunks of a remote device; and wherein, before transmitting the frames of data from the apparatus, each of the second port means inserts, into each of the frames of the data, a destination trunk indicator indicating one or all of the trunks of the remote device. In some embodiments, each of the frames of the data received into the apparatus by one of the second port means comprises a source trunk identifier identifying one of the trunks of the remote device; and wherein each of the first port means, on receiving one of the frames of the data received into the apparatus by one of the second port means, removes the source trunk identifier before transmitting the one of the frames of the data from the apparatus. In some embodiments, the first and second frames comprise Ethernet frames. Some embodiments comprise an integrated circuit comprising the apparatus. Some embodiments comprise an Ethernet switch comprising the apparatus. Some embodiments comprise a game console comprising the apparatus.

In general, in one aspect, the invention features a computer program for an apparatus comprising a plurality of ports comprising one or more first ports and one or more second ports, the computer program comprising: wherein the apparatus receives frames of data into the apparatus; causing the apparatus to transmit the frames of the data from the apparatus; storing associations between the ports and network addresses; causing the apparatus to transfer the frames among the ports according to the associations between the ports and the network addresses; causing the apparatus to transfer a first one of the frames to all of the ports except one of the first ports when the first one of the frames is received into the apparatus by the one of the first ports and has a destination network address that is not associated with any of the ports; and causing the apparatus to transfer a second one of the frames to all of the ports including one of the second ports when the second one of the frames is received into the apparatus by the one of the second ports and has a destination network address that is not associated with any of the ports.

Some embodiments comprise storing associations between the network addresses and trunks of the remote device; and before transmitting each of the frames of data from the apparatus at one of the second ports, inserting, into the frame, a destination trunk indicator indicating one or all of the trunks of the remote device. In some embodiments, each of the frames of the data received into the apparatus by one of the second ports comprises a source trunk identifier identifying one of the trunks of the remote device, further comprising: removing the source trunk identifier from each of the frames of the data received into the apparatus by one of the second ports before transmitting the frames of the data from the apparatus from one of the first ports. In some embodiments, the first and second frames comprise Ethernet frames; and wherein the network addresses comprise media access control (MAC) addresses. Some embodiments comprise an integrated circuit to perform the computer program.

The details of one or more implementations are set forth in the accompanying drawings and the description below. Other features will be apparent from the description and drawings, and from the claims.

Figure 1:
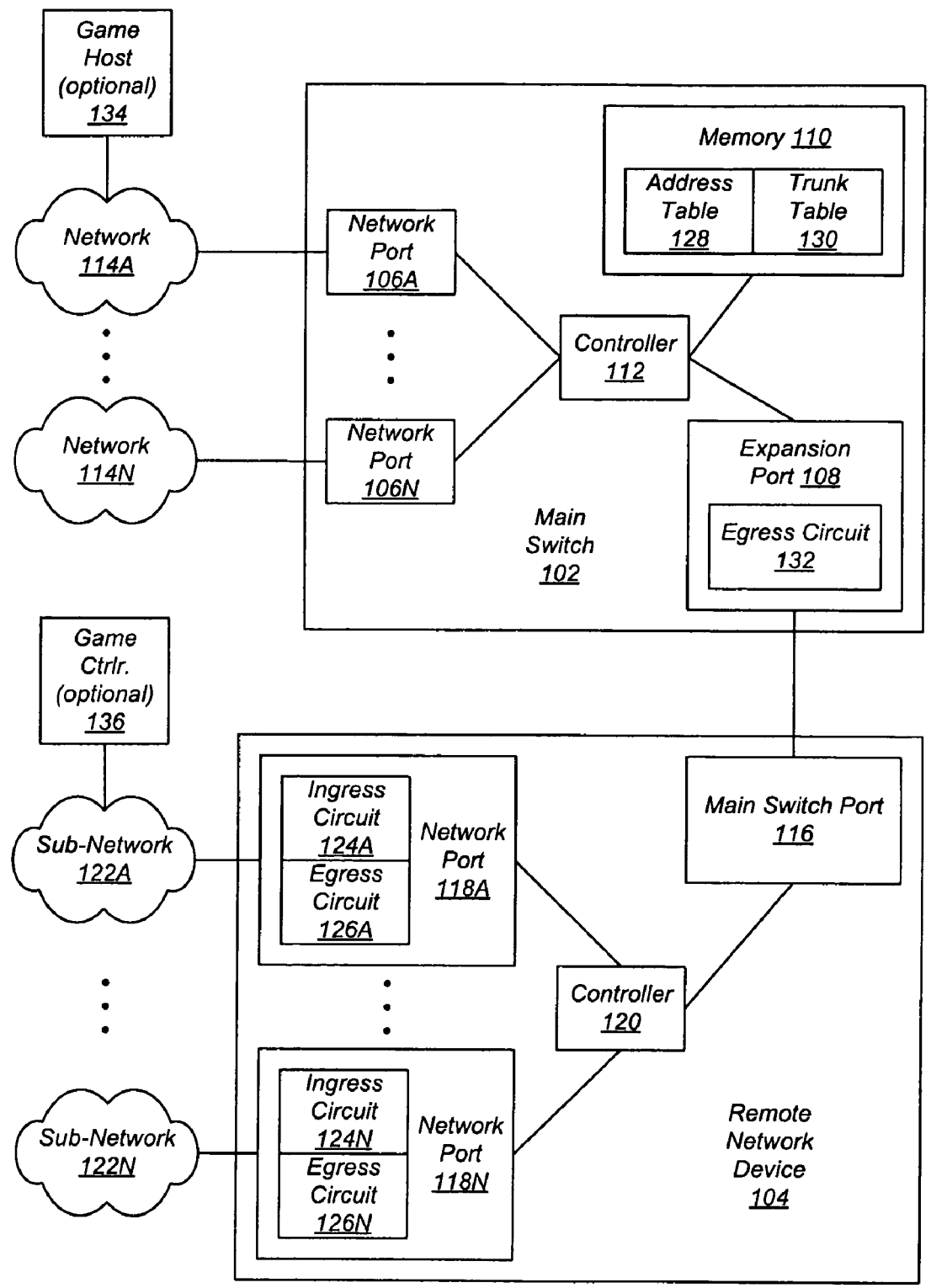
FIG. 1 shows a main switch connected to a remote network device according to a preferred embodiment of the present invention.

The leading digit(s) of each reference numeral used in this specification indicates the number of the drawing in which the reference numeral first appears.

DETAILED DESCRIPTION

Embodiments of the present invention provide a main switch to switch frames of data on behalf of a remote network device. Embodiments of the present invention also provide the remote network device.

FIG. 1 shows a main switch 102 connected to a remote network device 104 according to a preferred embodiment of the present invention. Main switch 102 is preferably implemented as an Ethernet switch, although other implementations are contemplated. Main switch 102 comprises a plurality of ports 106, 108 to transmit and receive frames of data, the ports 106, 108 comprising at least one network port 106 and at least one expansion port 108, a memory 110 to store switching data as described in detail below, and a controller 112 to transfer frames of data between ports 106, 108. One or more networks 114A-N can be connected to network ports 106. A remote network device 104 can be connected to each of expansion ports 108.

Remote network device 104 is preferably implemented as a wireless access point, although other implementations are contemplated. For example, remote network device 104 can be implemented as an additional Ethernet switch. Remote network device 104 comprises a plurality of ports 116, 118 to transmit and receive frames of data, the ports 116, 118 comprising at least one main switch port 116 and a plurality of network ports 118A-N, and a controller 120 to transfer frames of data between ports 116, 118. A main switch 102 can be connected to main switch port 116. Each network port 118 can be a physical or logical port that can serve one of a plurality of sub-networks 122A-N such as wireless base station sub-systems. Each network port 118 comprises a respective port ingress circuit 124A-N and a respective port egress circuit 126A-N, which can be implemented in hardware, software, or any combination thereof.

Some embodiments comprise a game console that incorporates one or both of main switch 102 and remote network device 104. According to such embodiments, an optional game host 134 exchanges frames of game data with main switch 102. Optional game host 134 preferably comprises a processor to execute game software, and can be implemented within main switch 102 or can communicate with main switch 102 over a network port 106 as shown in FIG. 1. One or more optional game controllers 136 exchange the frames of game data with remote network device 104 using network ports 118. Optional game controllers 136 can be dependent upon the game console, or can be stand-alone game devices each incorporating a processor to execute game software.

Figure 2:
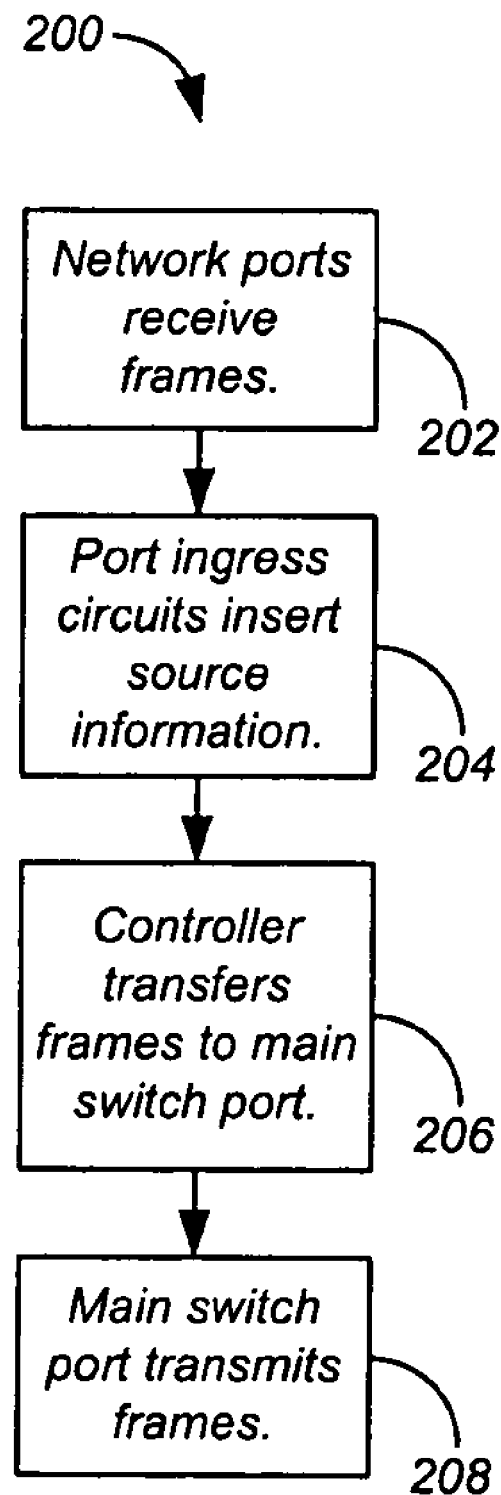
FIG. 2 shows a process for the remote network device of FIG. 1 for handling frames received into the remote network device by a network port according to a preferred embodiment of the present invention.

FIG. 2 shows a process 200 for remote network device 104 of FIG. 1 for handling frames received into remote network device 104 by network ports 118 according to a preferred embodiment of the present invention. While process 200 is described in terms of a wireless access point handling Ethernet frames, other implementations are contemplated. Referring again to FIG. 1, network ports 118 receive frames of data into remote network device 104 from sub-networks 122 (step 202). Each port ingress circuit 124 inserts, into each of the frames of the data received by the respective network port 118, source information identifying the respective network port 118 (step 204). For example, each network port 118 is assigned a trunk number, and each port ingress circuit 124, on receiving a frame of data from the associated sub-network 122, inserts the trunk number of the network port 118 into the frame. In one embodiment, the trunk number is inserted into each frame as a 5-bit binary number between the source address field and the length/type field, as described below, although of course other implementations are contemplated.

Remote network device 104 does no switching for the frames, instead relying upon main switch 102 to switch the frames, as described in detail below. Therefore controller 120 simply transfers each of the frames from network ports 118 to main switch port 116 (step 206), which transmits the frames from remote network device 104 (step 208).

Figure 3:
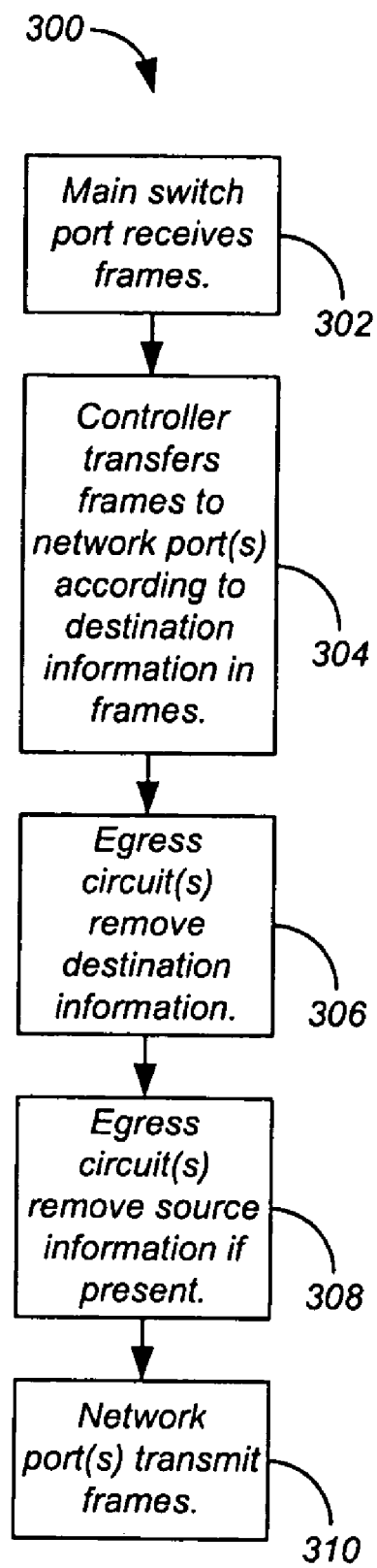
FIG. 3 shows a process for the remote network device of FIG. 1 for handling frames received into the remote network device by a main switch port according to a preferred embodiment of the present invention.

FIG. 3 shows a process 300 for remote network device 104 of FIG. 1 for handling frames received into remote network device 104 by main switch port 116 according to a preferred embodiment of the present invention. While process 300 is described in terms of a wireless access point handling Ethernet frames, other implementations are contemplated. Referring again to FIG. 1, main switch port 116 receives frames of data from main switch 102 (step 302).

Each of the frames, when received into remote network device 104 by main switch port 116, comprises destination information identifying one or more of network ports 118. For example, each network port 118 is assigned a trunk number, and each of the frames comprises a destination trunk ID that identifies one or more of the trunk numbers. Preferably the destination trunk ID identifies the trunk number of the network port 118 serving the sub-network 122 comprising the network device to which the frame is addressed when the trunk number is known, and identifies all of the network ports 118 when the trunk number is unknown. Preferably the destination trunk ID is generated and inserted into each frame by main switch 102, as described in detail below.

Controller 120 transfers each of the frames to one or more of network ports 118 according to the destination information in the frame (step 304). In particular, when the destination trunk ID in a frame identifies only one of network ports 118, controller 120 transfers the frame only to that network port 118, and when the trunk ID indicates that the destination trunk is unknown, controller 120 transfers the frame to all of network ports 118.

In some embodiments the frames comprise source information representing one of network ports 118, and controller 120 transfers the frames of the data to one or more of network ports 118 according to the destination information, and the source information, in the frames. For example, when one of the sub-networks 122 served by remote network device 104 comprises the source of the frame, the frame comprises the trunk number of the network port 118 serving the source sub-network 122, as described above with reference to FIG. 2. When the destination information indicates that the destination trunk is unknown, controller 120 uses the source information to transfer such frames to all of the network ports 118 except the source port 118 (that is, the network port 118 serving the source sub-network 122). In other embodiments, controller 120 transfers such frames to one or all of the network ports 118 regardless of the source information when the destination information indicates that the destination trunk number is known or unknown. Such embodiments permit the source and destination network devices for a frame to reside in the same sub-network 122.

Egress circuits 126 in network ports 118 remove the destination information from each of the frames before network ports 118 transmit the frames from remote network device 104 (step 306). For frames that also comprise source information, egress circuits 126 also remove the source information before network ports 118 transmit the frames from remote network device 104 (step 308). Network ports 118 then transmit the frames from remote network device 104 (step 310).

Figure 4:
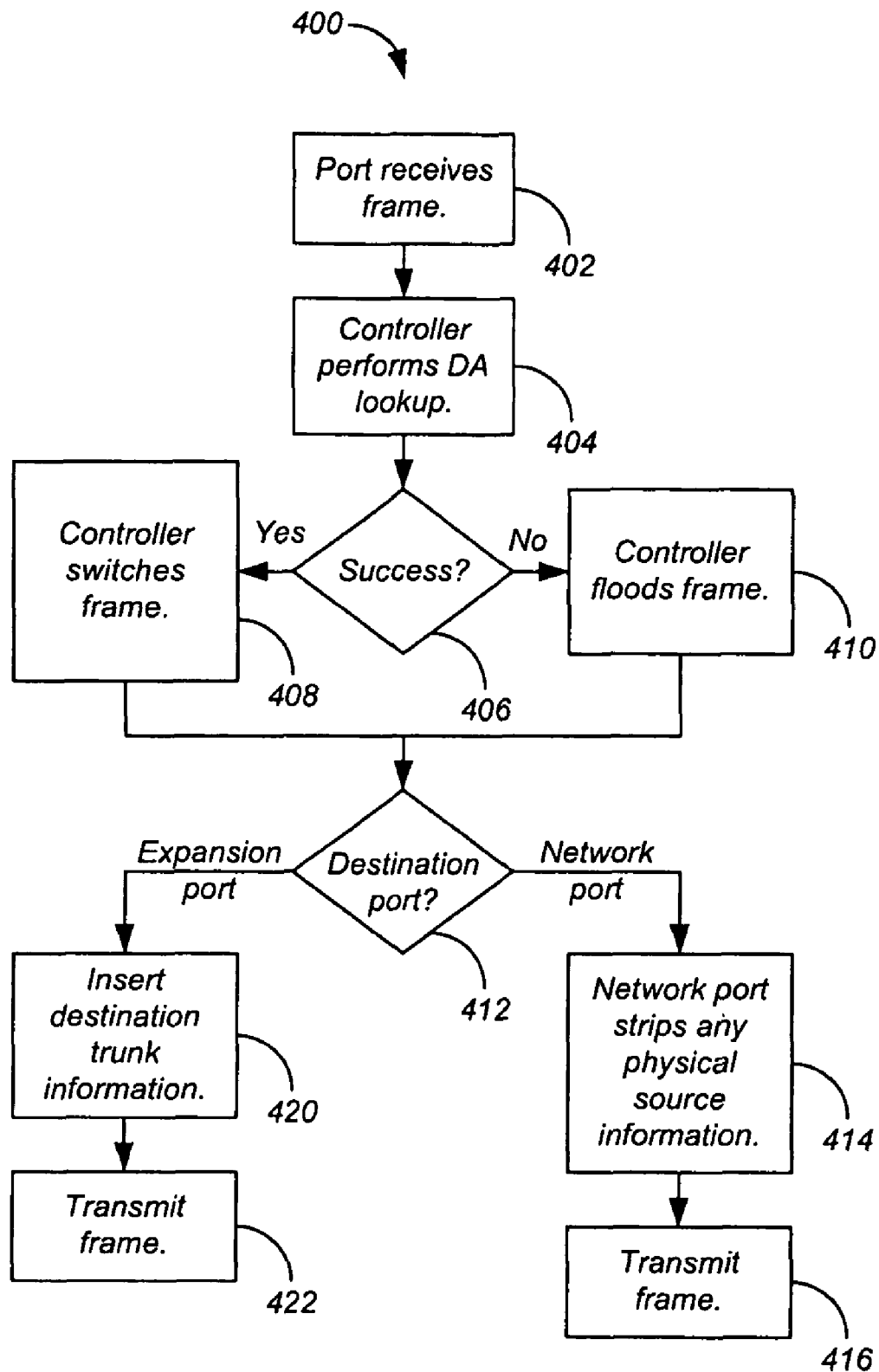
FIG. 4 shows a process for the main switch of FIG. 1 according to a preferred embodiment of the present invention.

FIG. 4 shows a process 400 for main switch 102 of FIG. 1 according to a preferred embodiment of the present invention. While process 400 is described in terms of an Ethernet switch handling Ethernet frames comprising media access control (MAC) addresses, other implementations are contemplated. Referring again to FIG. 1, ports 106, 108 receive frames of data into main switch 102 (step 402).

For each received frame, controller 112 performs a destination address lookup (step 404) to determine whether the destination MAC address of the frame has an entry in an address table 128 stored in memory 110 that associates the address with one of ports 106, 108 (step 406). Address table 128 is preferably populated by learning the associations according to techniques well-known in the relevant arts. Preferably learning comprises associating the address with the port 106, 108 from which the frame came or the trunk ID assigned to the frame, if any.

When the destination address lookup succeeds (that is, the frame comprises a trunk ID or has a destination MAC address that is associated with one or more of ports 106, 108, or is associated with a trunk ID), controller 112 switches the frame according to the lookup results (step 408). That is, if the lookup returns one or more ports, controller 112 transfers the frame only to the port(s) associated with the destination MAC address. But if the lookup returns one or more trunk IDs, controller 112 first looks up the trunk ID(s) in a trunk table 130 stored in memory 110 that associates trunk ID(s) with ports 106, 108 in main switch 102 and network ports 118 in remote network device 104, and then transfers the frame to those ports. Trunk table 130 is preferably loaded by software that assigns the trunk IDs to the ports 106, 108 (directly), and thus to port 118 (indirectly).

But when the destination address lookup fails (that is, the frame has a destination MAC address that is not associated with any of ports 106, 108 or trunk IDs), controller 112 floods the frame to ports 106, 108. For a frame received on one of network ports 106, controller 112 floods the frame to all of ports 106, 108 except the network port 106 that received the frame. For a frame received on expansion port 108, controller 112 floods the frame to all of network ports 106 and expansion port 108. The frame is flooded to expansion port 108 because both the source and destination devices for the frame may lie within the sub-networks 122 served by remote network device 104.

Frames to be egressed from one of network ports 106 (step 412) may comprise source information inserted by remote network device 104, as described above. Network ports 106 remove such source information from the frames (step 414) before transmitting the frames from main switch 102 (step 416).

Before transmitting a frame from main switch 102 on expansion port 108 (step 412), an egress circuit 132 in expansion port 108 inserts the trunk lookup result (from step 404) into the frame (step 420) before transmitting the frame (step 422).

But if the trunk lookup (step 404) did not result in a trunk ID, controller 112 inserts, into the frame, a flag or destination trunk ID indicating the failure, for example by clearing a bit to zero. In one embodiment, the trunk number is inserted into the frame as a 5-bit binary number comprising a one-bit flag between the start of frame delimiter and the destination address field, as described below, although of course other implementations are contemplated.

Figure 5:
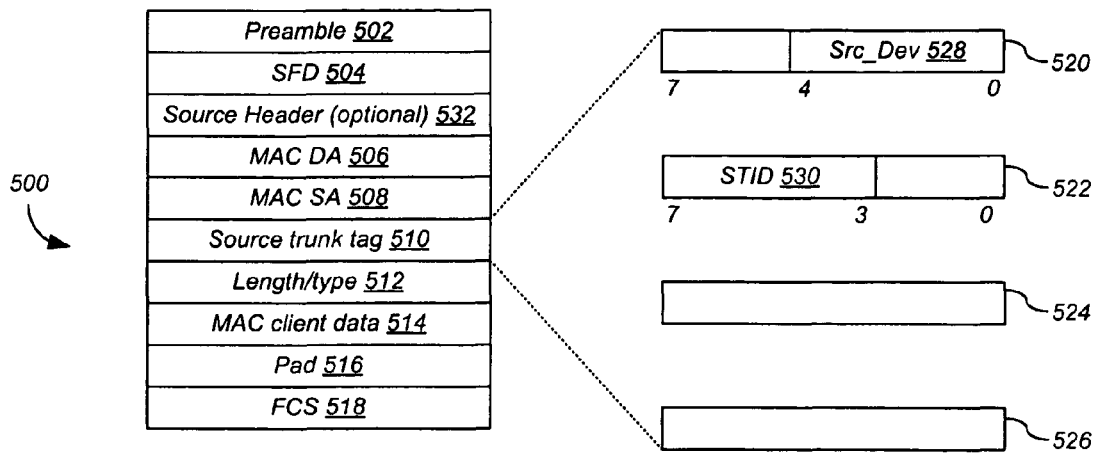
FIG. 5 shows the format of a frame transmitted by a main switch port from the remote network device of FIG. 1 according to a preferred embodiment of the present invention.

FIG. 5 shows the format of a frame 500 transmitted by main switch port 116 from remote network device 104 according to a preferred embodiment of the present invention. Frame 500 comprises a 7-octet preamble 502, a 1-octet start frame delimiter (SFD) 504, an optional 2-octet source header 532, a 6-octet MAC destination address (DA) 506, a 6-octet MAC source address (SA) 508, a 4-octet source trunk tag 510, a 2-octet length/type 512, MAC client data 514, a variable-size pad 516, and a frame check sequence (FCS) 518. Of course the fields of frame 500 can have different lengths and occur in different sequences than described, as will be apparent to one skilled in the relevant arts after reading this description. However, optional source header 532, when included, should be 2 octets in length, and should precede MAC client data field 514 in order to place any IP address in MAC client data field 514 completely within a single 32-bit word, thereby requiring only a single operation to perform network address translation. Optional 2-octet source header 532 can include any sort of data, or no data at all, for this or other applications.

As mentioned above, source trunk tag 510 preferably comprises four octets 520, 522, 524, and 526, although other tag sizes are contemplated. Preferably the first five bits of the first octet 520 of source trunk tag 510 comprise a five-bit source device (Src_Dev) indicator 528 that is populated by the device that is the source of the frame to indicate the device. Preferably the last five bits of the second octet 522 of source trunk tag 510 represent the source trunk number (STID) 530.

Figure 6:
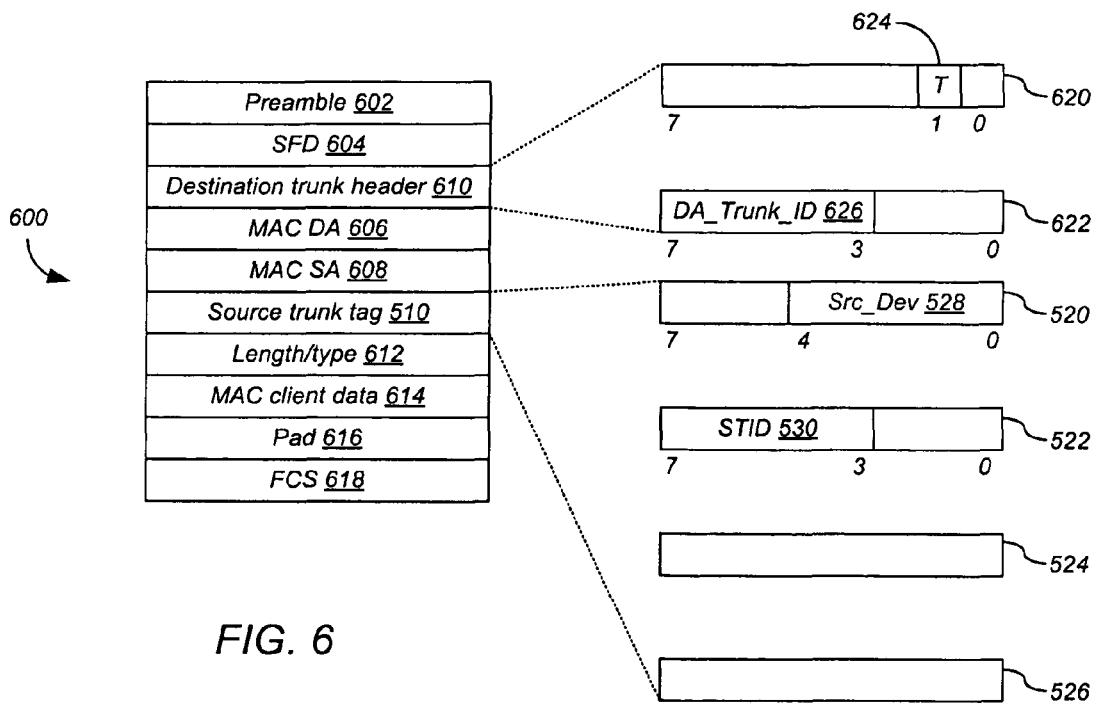
FIG. 6 shows the format of a frame transmitted by an expansion port from the main switch of FIG. 1 according to a preferred embodiment of the present invention.

FIG. 6 shows the format of a frame 600 transmitted by expansion port 108 from main switch 102 according to a preferred embodiment of the present invention. Frame 600 comprises a 7-octet preamble 602, a 1-octet SFD 604, a 2-octet destination trunk header 610, a 6-octet MAC destination address (DA) 606, a 6-octet MAC source address (SA) 608, 4-octet source trunk tag 510, a 2-octet length/type 612, MAC client data 614, a variable-size pad 616, and a frame check sequence (FCS) 618. Of course the fields of frame 600 can have different lengths and occur in different sequences than described, as will be apparent to one skilled in the relevant arts after reading this description.

As mentioned above, destination trunk tag 610 preferably comprises two octets 620 and 622, although other tag sizes are contemplated. However, the 2-octet length will place any IP address in MAC client data field 614 completely within a single 32-bit word, thereby requiring only a single operation to perform network address translation. Preferably the second bit of first octet 620 of destination trunk tag 610 comprises a DA_Trunk bit (T) 624 that is set by controller 112 of main switch 102 when the destination trunk lookup (step 404 of FIG. 4) returns a trunk association and cleared otherwise. When DA_Trunk bit 624 is set, the last five bits of second octet 622 of destination trunk tag 610 comprises a DA_Trunk_ID 626 that represents the destination trunk number from the destination trunk lookup.

When the destination trunk number of a frame received into remote network device 104 by main switch port 116 is unknown (bit 624=0), controller 120 optionally determines whether remote network device 104 was the source device of the frame (that is, whether the frame was originally received into remote network device 104 by one of network ports 118) by examining Src_Dev indicator 528. If Src_Dev indicator 528 indicates that remote network device 104 is the source device of the frame, then remote network device 104 floods the frame to all of network ports 118 except the network port 118 indicated by source trunk number 530 (if mapping frames back to the original source port is not desired).

Referring now to FIGS. 7A-7E, various exemplary implementations of the present invention are shown.

Figure 7B:
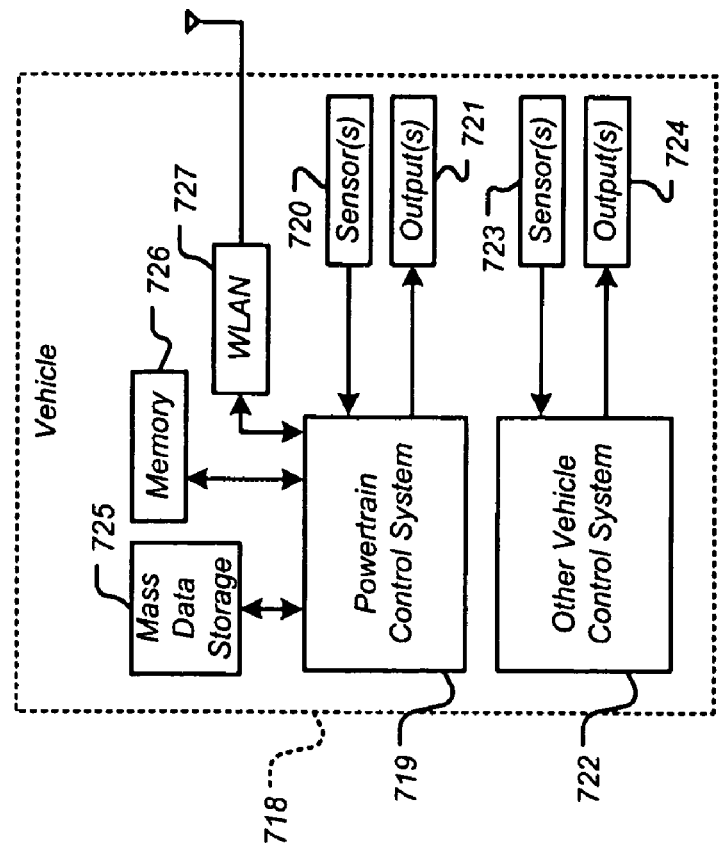
FIGS. 7A-7E show various exemplary implementations of the present invention are shown.
Figure 7A:
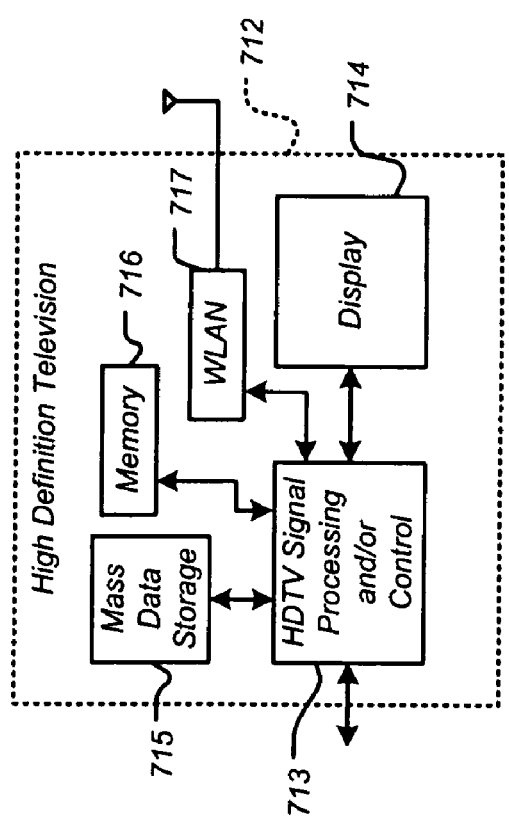

Referring now to FIG. 7A, the present invention can be implemented in a high definition television (HDTV) 712. The present invention may implement either or both signal processing and/or control circuits, which are generally identified in FIG. 7A at 713, a WLAN interface and/or mass data storage of the HDTV 712. The HDTV 712 receives HDTV input signals in either a wired or wireless format and generates HDTV output signals for a display 714. In some implementations, signal processing circuit and/or control circuit 713 and/or other circuits (not shown) of the HDTV 712 may process data, perform coding and/or encryption, perform calculations, format data and/or perform any other type of HDTV processing that may be required.

The HDTV 712 may communicate with mass data storage 715 that stores data in a nonvolatile manner such as optical and/or magnetic storage devices. The HDD may be a mini HDD that includes one or more platters having a diameter that is smaller than approximately 1.8". The HDTV 712 may be connected to memory 716 such as RAM, ROM, low latency nonvolatile memory such as flash memory and/or other suitable electronic data storage. The HDTV 712 also may support connections with a WLAN via a WLAN network interface 717.

Referring now to FIG. 7B, the present invention implements a control system of a vehicle 718, a WLAN interface and/or mass data storage of the vehicle control system. In some implementations, the present invention implements a powertrain control system 719 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 722 of the vehicle 718. The control system 722 may likewise receive signals from input sensors 723 and/or output control signals to one or more output devices 724. In some implementations, the control system 722 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 719 may communicate with mass data storage 725 that stores data in a nonvolatile manner. The mass data storage 725 may include optical and/or magnetic storage devices for example hard disk drives HDD and/or DVDs. The HDD may be a mini HDD that includes one or more platters having a diameter that is smaller than approximately 1.8". The powertrain control system 719 may be connected to memory 726 such as RAM, ROM, low latency nonvolatile memory such as flash memory and/or other suitable electronic data storage. The powertrain control system 719 also may support connections with a WLAN via a WLAN network interface 727. The control system 722 may also include mass data storage, memory and/or a WLAN interface (all not shown).

Figure 7C:
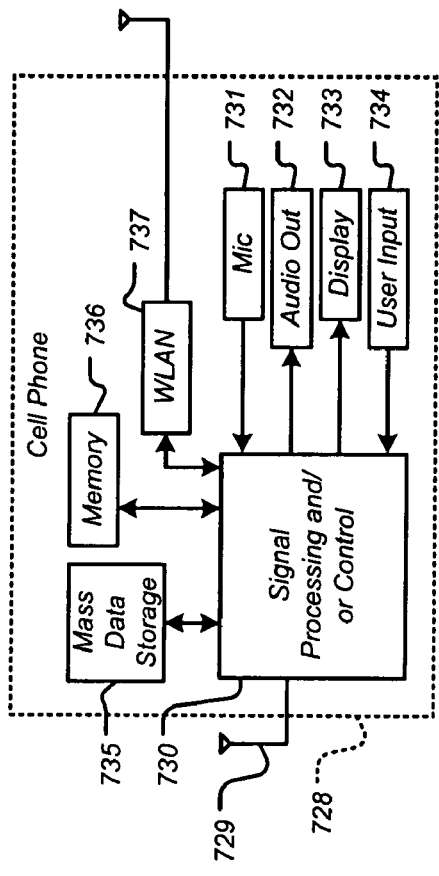

Referring now to FIG. 7C, the present invention can be implemented in a cellular phone 728 that may include a cellular antenna 729. The present invention may implement either or both signal processing and/or control circuits, which are generally identified in FIG. 7C at 730, a WLAN interface and/or mass data storage of the cellular phone 728. In some implementations, the cellular phone 728 includes a microphone 731, an audio output 732 such as a speaker and/or audio output jack, a display 733 and/or an input device 734 such as a keypad, pointing device, voice actuation and/or other input device. The signal processing and/or control circuits 730 and/or other circuits (not shown) in the cellular phone 728 may process data, perform coding and/or encryption, perform calculations, format data and/or perform other cellular phone functions.

The cellular phone 728 may communicate with mass data storage 735 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 728 may be connected to memory 736 such as RAM, ROM, low latency nonvolatile memory such as flash memory and/or other suitable electronic data storage. The cellular phone 728 also may support connections with a WLAN via a WLAN network interface 737.

Figure 7D:
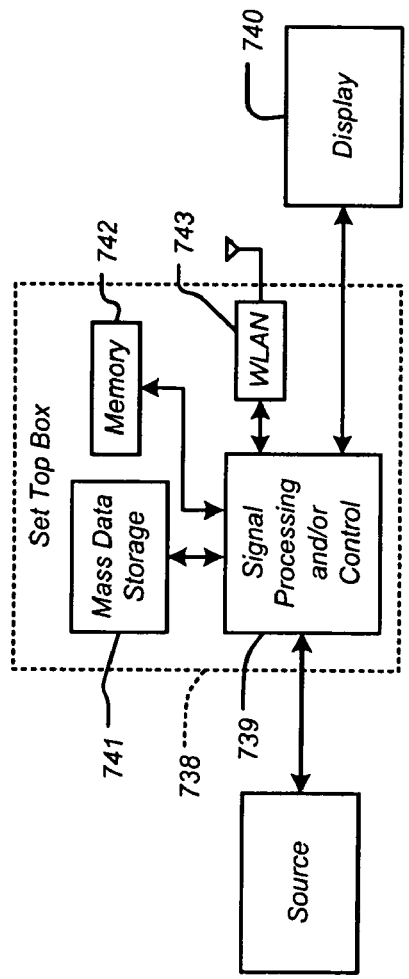

Referring now to FIG. 7D, the present invention can be implemented in a set top box 738. The present invention may implement either or both signal processing and/or control circuits, which are generally identified in FIG. 7D at 739, a WLAN interface and/or mass data storage of the set top box 738. The set top box 738 receives signals from a source such as a broadband source and outputs standard and/or high definition audio/video signals suitable for a display 740 such as a television and/or monitor and/or other video and/or audio output devices. The signal processing and/or control circuits 739 and/or other circuits (not shown) of the set top box 738 may process data, perform coding and/or encryption, perform calculations, format data and/or perform any other set top box function.

The set top box 738 may communicate with mass data storage 743 that stores data in a nonvolatile manner. The mass data storage 743 may include optical and/or magnetic storage devices for example hard disk drives HDD and/or DVDs. The HDD may be a mini HDD that includes one or more platters having a diameter that is smaller than approximately 1.8". The set top box 738 may be connected to memory 742 such as RAM, ROM, low latency nonvolatile memory such as flash memory and/or other suitable electronic data storage. The set top box 738 also may support connections with a WLAN via a WLAN network interface 743.

Figure 7E:
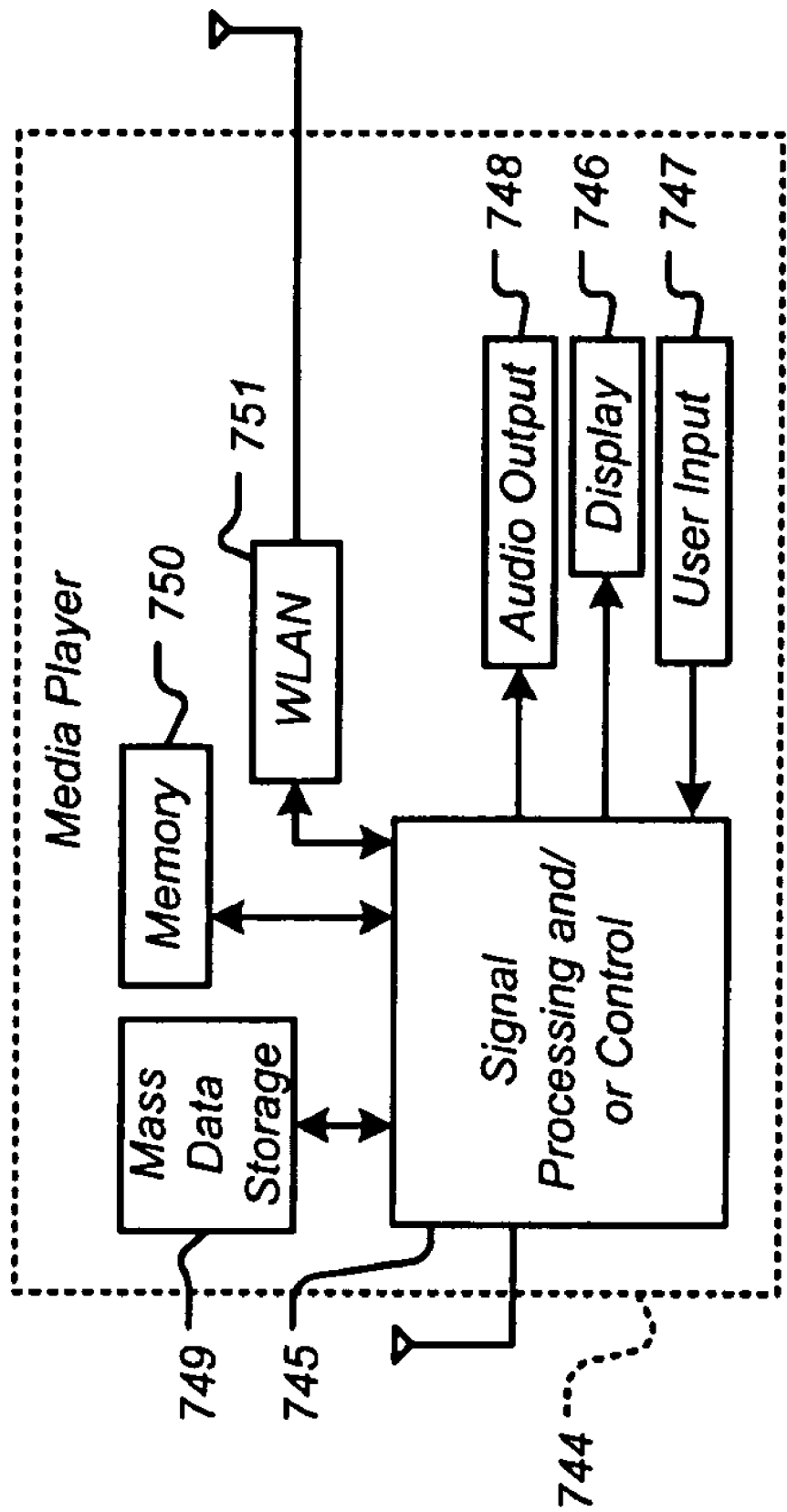

Referring now to FIG. 7E, the present invention can be implemented in a media player 744. The present invention may implement either or both signal processing and/or control circuits, which are generally identified in FIG. 7E at 745, a WLAN interface and/or mass data storage of the media player 744. In some implementations, the media player 744 includes a display 746 and/or a user input 747 such as a keypad, touchpad and the like. In some implementations, the media player 744 may employ a graphical user interface (GUI) that typically employs menus, drop down menus, icons and/or a point-and-click interface via the display 746 and/or user input 747. The media player 744 further includes an audio output 748 such as a speaker and/or audio output jack. The signal processing and/or control circuits 745 and/or other circuits (not shown) of the media player 744 may process data, perform coding and/or encryption, perform calculations, format data and/or perform any other media player function.

The media player 744 may communicate with mass data storage 749 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 744 may be connected to memory 750 such as RAM, ROM, low latency nonvolatile memory such as flash memory and/or other suitable electronic data storage. The media player 744 also may support connections with a WLAN via a WLAN network interface 751. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
    a plurality of first ports configured to (i) receive first frames of data into the apparatus, and (ii) transmit second frames of the data from the apparatus, wherein each of the plurality of first ports comprises a respective port ingress circuit, wherein the port ingress circuits are configured to insert, into each of the first frames of the data received by the respective one of the first ports, source information identifying the respective one of the first ports;
    a second port configured to (i) transmit the first frames of the data from the apparatus to a switch without transmitting destination information identifying a port of the apparatus, and (ii) receive the second frames of the data into the apparatus from the switch, wherein each of the second frames of the data, when received by the second port, comprises destination information identifying one or more of the first ports from which the second frames of the data are transmitted from the apparatus; and
    a controller configured to (i) transfer each of the first frames of the data from the first ports to the second port, and (ii) transfer each of the second frames of the data from the second port to one or more of the first ports according to the destination information in the second frames of the data,
    wherein each of the first ports further comprises a respective port egress circuit, and wherein the port egress circuits are configured to remove the destination information from the second frames of the data prior to the first ports transmitting respective ones of the second frames of the data from the apparatus.

2. The apparatus of claim 1, wherein the controller is configured to transfer each of the second frames of the data from the second port to the respective one or more of the first ports identified by the destination information in the second frames of the data.

3. The apparatus of claim 1, wherein:
    one or more of the second frames of the data comprises source information identifying one of the first ports;
    the controller is configured to transfer each of the one or more of the second frames of the data to one or more of the first ports according to the destination information and the source information in each of the one or more of the second frames of the data; and
    the port egress circuits, in the one or more of the first ports, are configured to remove the source information from each of the second frames of the data prior to the one or more of the first ports transmitting the second frames of the data from the apparatus.

4. The apparatus of claim 3, wherein the controller is configured to transfer the one of the second frames of the data to all of the first ports except one of the first ports when one of the second frames of the data comprises source information, and wherein the source information of the one of the second frames of the data identifies the one of the first ports.

5. The apparatus of claim 1, wherein the first frames and the second frames comprise Ethernet frames.

6. The apparatus of claim 1, wherein the destination information comprises at least one of a destination address or a destination trunk number.

7. The apparatus of claim 1, wherein the destination information identifies the one or more of the first ports and a network device, and wherein the network device is distinct from the apparatus.

8. The apparatus of claim 1, wherein:
    the first frames comprise the data, and
    the second frames comprise the data.

9. The apparatus of claim 1, wherein:
    the apparatus is a first network device;
    the plurality of first ports is configured to receive the first frames of the data from a second network device; and
    the plurality of first ports is configured to transmit the second frames of the data to a third network device.

10. The apparatus of claim 1, wherein a first one of the frames of the data comprises:
    a preamble;
    a start frame delimiter;
    a destination media access control (MAC) address;
    a source MAC address;
    a source trunk tag comprising:
        a source device indicator that identifies a network device, wherein the network device is (i) distinct from the apparatus, and (ii) originates the first one of the frames of the data; and
        a source trunk number that identifies a port of the network device, wherein the port of the network device receives the first one of the frames of the data;
    a length/type identifier;
    MAC client data; and
    a frame check sequence.

11. The apparatus of claim 10, wherein the controller is configured to transfer the first one of the frames of the data between ports of the apparatus.

12. The apparatus of claim 10, wherein:
    the controller is configured to transmit the first one of the frames of the data to a the switch via a switch port, wherein the switch is distinct from the apparatus; and the controller is configured to receive a second one of the frames of the data including at least one of a destination address or a destination trunk number via the switch port.

13. The apparatus of claim 1, wherein the plurality of first ports are configured to (i) receive the first frames of the data from a network, and (ii) transmit the second frames of the data to the network.

14. The apparatus of claim 1, wherein:
the second port is configured to transmit the first frames of the data from the apparatus to a network device;
the second frames of the data include (i) the first frames of the data, and (ii) the destination information identifying the one or more of the first ports from which to transmit the first frames of the data; and
the second port is configured to receive the second frames of the data from the network device.

15. The apparatus of claim 1, wherein the one or more of the first ports identified in the destination information of the second frames of the data is different than one or more of the plurality of first ports at which the first frames of the data were received.

16. An integrated circuit comprising the apparatus of claim 1.

17. A wireless access point comprising the apparatus of claim 1.

18. A game console comprising the apparatus of claim 1.

19. A method for an apparatus comprising (i) a plurality of first ports, and (ii) a second port, the method comprising:
receiving first frames of data into the apparatus at the first ports;
transmitting second frames of the data from the apparatus at the first ports;
inserting, into each of the first frames of the data received into the apparatus at a respective one of the first ports, source information identifying the respective one of the first ports;
transmitting the first frames of the data from the apparatus at the second port to a switch without transmitting destination information identifying a port of the apparatus;
receiving the second frames of the data into the apparatus at the second port from the switch, wherein each of the second frames of the data, when received at the second port, comprises destination information identifying one or more of the first ports from which the second frames of the data are transmitted from the apparatus;
transferring each of the first frames of the data from the first ports to the second port;
transferring each of the second frames of the data from the second port to one or more of the first ports according to the destination information in the second frames of the data; and
removing the destination information from the second frames of the data prior to the first ports transmitting respective one of the second frames of the data from the apparatus.

20. The method of claim 19, wherein each of the second frames of the data are transferred from the second port to the respective one or more of the first ports identified by the destination information in the second frames of the data.

21. The method of claim 19, wherein:
one or more of the second frames of the data comprises source information identifying one of the first ports;
each of the one or more of the second frames of the data are transferred to one or more of the first ports according to the destination information and the source information in each of the one or more of the second frames of the data; and
the source information is removed from each of the second frames of the data prior to transmitting the second frames of the data from the apparatus at the first ports.

22. The method of claim 21, wherein the one of the second frames of the data are transferred to all of the first ports except one of the first ports when one of the second frames of the data comprises source information, and wherein the source information of the one of the second frames of the data identifies the one of the first ports.

23. The method of claim 19, wherein the first frames and the second frames comprise Ethernet frames.

24. An apparatus comprising:
a plurality of ports configured to (i) receive frames of data into the apparatus, and (ii) transmit the frames of the data from the apparatus, the plurality of ports comprising first ports and second ports;
a memory configured to store associations between the plurality of ports and network addresses;
a controller configured to transfer the frames of the data between the plurality of ports according to the associations between the plurality of ports and the network addresses stored in the memory,
wherein the controller is configured to transfer a first one of the frames to all of the plurality of ports except one of the first ports when the first one of the frames of the data (i) is received into the apparatus by the one of the first ports, and (ii) has a first destination network address that is not associated with any of the plurality of ports, and
wherein the controller is configured to transfer a second one of the frames of the data to all of the plurality of ports including one of the second ports when the second one of the frames of the data (i) is received into the apparatus by the one of the second ports, and (ii) has a second destination network address that is not associated with any of the plurality of ports;
the memory is configured to store associations between (i) destination network addresses of the frames of the data, and (ii) destination trunk identifiers of a remote device, wherein each of the destination trunk identifiers identifies a destination trunk number of a respective port of the remote device; and
the controller is configured to (i) access one of the destination trunk identifiers from the memory based on a destination network address of a third one of the frames of the data received from one of the plurality of ports, and (ii) insert into the third one of the frames of the data the one of the destination trunk identifiers prior to transmitting the third one of the frames of the data from the apparatus to the remote device,
wherein the one of the destination trunk identifiers identifies one of the destination trunk numbers of one of the ports of the remote device from which the third one of the frames of the data is to be transmitted from the remote device.

25. The apparatus of claim 24, wherein each of the second ports is configured to insert into each of the frames of the data a destination trunk identifier identifying one or all of the trunk numbers of the ports of the remote device prior to transmitting the frames of the data from the apparatus to the remote device.

26. The apparatus of claim 25, wherein:
each of the frames of the data received into the apparatus by the one of the second ports comprises a source trunk identifier, wherein the source trunk identifier identifies one of the trunk numbers of the ports of the remote device; and each of the first ports is configured to remove the source trunk identifier from the frames of the data prior to transmitting the frames of the data from the apparatus to the remote device.

27. The apparatus of claim 24, wherein the first ones of the frames of the data and the second ones of the frames of the data comprise Ethernet frames.

28. The apparatus of claim 24, wherein:
the controller is configured to transfer the frames of the data to all of the plurality of ports except the first ports when
the frames of the data are received into the apparatus by the one of the first ports, and
the frames of the data have the destination network address; and
the controller is configured to transfer the frames of the data to all of the plurality of ports including one of the second ports when
the frames of the data are received into the apparatus by the one of the second ports, and
the frames of the data have the destination network address.

29. The apparatus of claim 24, wherein:
the apparatus is a switch;
the first ports are configured to receive the frames of the data from a first network device; and
at least one of the first ports or the second ports transmits the frames of the data to at least one of the first network device or a second network device.

30. The apparatus of claim 24, wherein the controller is configured to generate a frame of data based on one of the frames of the data received from a first network device, wherein the first network device is distinct from the apparatus, and wherein the frame of data generated by the controller comprises:
a preamble;
a start frame delimiter;
a destination trunk tag comprising
a DA_Trunk bit that (i) is set when a destination trunk number of the first network device identifies the frame of data generated by the controller, and (ii) is clear otherwise, and
a DA_Trunk_ID that identifies the destination trunk number;
a destination media access control (MAC) address;
a source MAC address;
a length/type identifier;
MAC client data; and
a frame check sequence.

31. The apparatus of claim 30, wherein the frame of data generated by the controller further comprises a source trunk tag, wherein the source trunk tag comprises:
a source device indicator that identifies a second network device, wherein the second network device originates the one of the frames of the data; and
a source trunk number that identifies a port of the first network device, wherein the first network device receives the one of the frames of the data.

32. The apparatus of claim 30, wherein the controller is configured to transmit the frame of data generated by the controller to the first network device for transmission to a second network device via an expansion port.

33. The apparatus of claim 30, wherein the DA_Trunk_ID identifies a first port of the first network device for transmission of the frame of data generated by the controller from the first network device to a second network device.

34. The apparatus of claim 24, wherein the controller is configured to:
transfer the frames of the data received into the apparatus by the one of the first ports to all of the plurality of ports except the one of the first ports when the frames of the data received in the apparatus by the one of the first ports have destination network addresses that are not associated with any of the plurality of ports; and
transfer the frames of the data received into the apparatus by the one of the second ports to all of the plurality of ports including the one of the second ports when the frames of the data received in the apparatus by the one of the second ports have destination network addresses that are not associated with any of the plurality of ports.

35. The apparatus of claim 24, wherein the controller is configured to, based on which one of the plurality of ports receives the frames of the data, transfer the frames of the data to either (i) all of the plurality of ports, or (ii) all of the plurality of ports except the one of the plurality of ports.

36. An integrated circuit comprising the apparatus of claim 24.

37. An Ethernet switch comprising the apparatus of claim 24.

38. A game console comprising the apparatus of claim 24.

39. A method for an apparatus comprising a plurality of ports, the plurality of ports including (i) first ports, and (ii) second ports, the method comprising:
receiving frames of data into the apparatus;
transmitting the frames of the data from the apparatus;
storing associations between the plurality of ports and network addresses;
transferring the frames of the data between the plurality of ports according to the associations between the plurality of ports and the network addresses;
transferring a first one of the frames of the data to all of the plurality of ports except one of the first ports when the first one of the frames of the data (i) is received into the apparatus by the one of the first ports, and (ii) has a destination network address that is not associated with any of the plurality of ports;
transferring a second one of the frames of the data to all of the plurality of ports including one of the second ports when the second one of the frames of the data (i) is received into the apparatus by the one of the second ports, and (ii) has a destination network address that is not associated with any of the plurality of ports;
storing associations between (i) destination network addresses of the frames of the data, and (ii) destination trunk identifiers of a remote device, wherein each of the destination trunk identifiers identifies a destination trunk number of a respective port of the remote device;
accessing one of the destination trunk identifiers from a memory based on a destination network address of a third one of the frames of the data received from one of the plurality of ports; and
inserting into the third one of the frames of the data the one of the destination trunk identifiers prior to transmitting the third one of the frames of the data from the apparatus to the remote device,
wherein the one of the destination trunk identifiers identifies one of the destination trunk numbers of one of the ports of the remote device from which the third one of the frames of the data is to be transmitted from the remote device.

40. The method of claim 39, inserting into each of the frames of the data a destination trunk identifier, wherein the destination trunk identifier identifies at least one of the trunk numbers of the ports of the remote device prior to transmitting the frames of the data from the apparatus at one of the second ports to the remote device.

41. The method of claim 40, wherein:
- each of the frames of the data received into the apparatus by one of the second ports comprises a source trunk identifier, wherein the source trunk identifier identifies one of the trunk numbers of the ports of the remote device; and
- the method further comprises removing the source trunk identifier from each of the frames of the data received into the apparatus by one of the second ports prior to transmitting the frames of the data from the apparatus via one of the first ports to the remote device.

42. The method of claim 39, wherein:
- the first ones of the frames and second ones of the frames of the data comprise Ethernet frames; and
- the network addresses comprise media access control addresses.

43. A system comprising:
- the apparatus of claim 14; and
- the network device, wherein the network device is configured to (i) identify the one or more of the first ports to transmit the first frames of the data from the apparatus based on a destination address in the first frames of the data, (ii) identify the one or more of the first ports by adding the destination information to the first frames of the data to generate the second frames of the data, and (iii) transmit the second frames of the data to the second port.

44. A network device comprising:
- a plurality of first ports configured to (i) receive first frames of data into the network device, and (ii) transmit second frames of the data from the network device, wherein each of the plurality of first ports comprises a respective port ingress circuit, wherein the port ingress circuits are configured to insert, into each of the first frames of the data received by the respective one of the first ports, source information identifying the respective one of the first ports;
- a second port configured to (i) transmit the first frames of the data from the network device to a switch without transmitting destination information identifying a port of the apparatus, and (ii) receive the second frames of the data into the network device from the switch, wherein each of the second frames of the data, when received by the second port, comprises destination information identifying one or more of the first ports from which the second frames of the data are transmitted from the network device; and
- a controller configured to (i) transfer each of the first frames of the data from the first ports to the second port, and (ii) transfer each of the second frames of the data from the second port to one or more of the first ports according to the destination information in the second frames of the data,
- wherein each of the first ports further comprises a respective port egress circuit, and wherein the port egress circuits are configured to remove the destination information from the second frames of the data prior to the first ports transmitting respective ones of the second frames of the data from the network device.

* * * * *